United States Patent
Pope

(10) Patent No.: US 9,781,912 B2
(45) Date of Patent: Oct. 10, 2017

(54) BEAMER BOARD CULLING SYSTEM

(71) Applicant: Chris R Pope, Pensacola, FL (US)

(72) Inventor: Chris R Pope, Pensacola, FL (US)

( * ) Notice: Subject to any disclaimer, the term of this patent is extended or adjusted under 35 U.S.C. 154(b) by 0 days.

(21) Appl. No.: 15/239,448

(22) Filed: Aug. 17, 2016

(65) Prior Publication Data
US 2016/0353726 A1 Dec. 8, 2016

Related U.S. Application Data

(60) Provisional application No. 62/302,150, filed on Mar. 1, 2016.

(51) Int. Cl.
| | |
|---|---|
| *G01G 19/60* | (2006.01) |
| *A01K 97/00* | (2006.01) |
| *G01G 1/18* | (2006.01) |
| *G01G 19/50* | (2006.01) |

(52) U.S. Cl.
CPC .............. *A01K 97/00* (2013.01); *G01G 1/18* (2013.01); *G01G 19/50* (2013.01); *G01G 19/60* (2013.01)

(58) Field of Classification Search
CPC .......... G01G 19/52; G01G 19/60; G01G 1/18; G01G 21/26
See application file for complete search history.

(56) References Cited

U.S. PATENT DOCUMENTS

| | | | | |
|---|---|---|---|---|
| 326,975 A * | 9/1885 | Guild | ...................... | G01G 1/18 177/197 |
| 2,805,850 A * | 9/1957 | Robinson | ................ | G01G 19/56 101/389.1 |
| 2,816,750 A * | 12/1957 | Martin | ...................... | G01G 3/08 177/129 |
| 3,759,337 A * | 9/1973 | Luedke | ................... | G01G 21/26 177/172 |
| 4,547,989 A * | 10/1985 | Karlsson | ................. | A01K 97/14 177/251 |
| 4,643,267 A * | 2/1987 | Southern | ................ | G01G 19/60 177/190 |
| 4,721,174 A * | 1/1988 | Letzo | ...................... | G01G 19/60 177/132 |
| D295,615 S * | 5/1988 | Marto | ............................ | D10/90 |
| 5,121,804 A * | 6/1992 | Labs | ...................... | G01G 19/60 177/132 |
| 5,637,838 A * | 6/1997 | Arey | ..................... | A01K 61/001 177/148 |

(Continued)

*Primary Examiner* — Natalie Huls
(74) *Attorney, Agent, or Firm* — Barry Choobin; Patent 360

(57) ABSTRACT

The embodiments herein provide a beamer board for measuring length and comparing weight of two identical objects including fishes. The beamer board acting as a culling system comprises an elongated beam, a first attachment, a slot and a pair of notches. The elongated beam comprises several measurement marks along a length direction for measuring a length of the fishes. The first attachment extending from the beam acts as a starting point for measuring the length. The slot is provided at center for hanging the beam on a holder. The slot act as a fulcrum balance point for balancing the beam. The pair of notches is configured for hanging the objects for comparing the weight of the fishes. The fishes are hanged on the pair of notches using any cull markers available in the markets.

12 Claims, 4 Drawing Sheets

(56) References Cited

U.S. PATENT DOCUMENTS 6,044,582 A * 4/2000 Johnson .............. A01K 61/90
  223/103
6,429,391 B1 * 8/2002 Gruver .............. G01G 19/14
  177/148

* cited by examiner

BEAMER BOARD CULLING SYSTEM

BACKGROUND

Technical Field

The embodiments herein are generally related to sport or gaming accessories. The embodiments herein are particularly related to a fishing accessory or an apparatus for comparing length and weight of identical objects. The embodiments herein are more particularly related to a beamer board for culling fishes by comparing length and weight of fishes.

Description of the Related Art

Nowadays, people's interest in the sport of competitive fishing is growing extensively. In competitive fishing, a fisherman obtaining highest gross weight of catch by catching a predetermined number of fishes in a predetermined time period is considered as winner. Therefore, the fishermen needs to quickly identify the fishes that meets the predetermined length set by the authorities for the competition as well as the heaviest fishes among the lot in a live well. Typically, the predetermined number of fishes varies from five to ten. Thus, the fisherman keeps culling the fishes caught from the live well by selecting the heaviest fishes.

Conventionally, the fisherman carries an equipment to determine and record the weight of different fishes caught from the live well. The weight is recorded for comparison with the other fishes. However, the process of determining and recording the weights are a time consuming as the actual weights are measured. Further, the fishermen need to carry a scale for determining the length of the fishes. Carrying multiple devices becomes cumbersome for the fishermen. Recently, digital instruments are developed that could benefit the fishermen. The digital instruments provide accurate and precise measurement of length and weight of the fish. However, the digital instruments are generally complex and expensive.

Hence, there is a need for a single beamer board culling system capable of quickly determining a length and comparing a weight of the fishes. There is also a need for an inexpensive and efficient culling system. Further, there is a need for an efficient beamer board culling system working on a simple principle.

The above mentioned shortcomings, disadvantages and problems are addressed herein and which will be understood by reading and studying the following specification.

OBJECTS OF THE EMBODIMENTS

The primary object of the embodiments herein is to provide a multifunction beamer board capable of quickly determining a length of the fishes and comparing a weight of the fishes.

Another object of the embodiments herein is to provide a beamer board performing a function of a measuring scale for determining length of fishes in multiple catches quickly.

Yet another object of the embodiments herein is to provide a beamer board comprising a plurality of measurement marking for enabling a user to take reading directly from the beamer board while measuring the length.

Yet another object of the embodiments herein is to provide a beamer board comprising a first attachment protruding from one end of the beamer board for enabling a user to start measuring all fishes from same point.

Yet another object of the embodiments herein is to provide a beamer board acting as a balance beam capable of weighing the multiple catches to determine a fish to be released or retained.

Yet another object of the embodiments herein is to provide a beamer board with a slot at the centre acting as a fulcrum balance point for balancing the beamer board while functioning as a balance beam.

Yet another object of the embodiments herein is to provide a beamer board comprising a pair of notches for enabling a user to hang the fishes while comparing the weight.

Yet another object of the embodiments herein is to provide a beamer board capable of being used with different types of cull markers available in the market.

Yet another object of the embodiments herein is to provide a beamer board capable of allowing a user to retain the heaviest catches while releasing lightest catches in lesser time.

Yet another object of the embodiments herein is to provide a beamer board capable of allowing a user to easily identify whether a fish in a live well is heavier or lightweight than the fishes caught.

Yet another object of the embodiments herein is to provide a beamer board comprising a detachable handle that enables the beamer board to be hanged on a holder for conveniently weighing the multiple catches.

Yet another object of the embodiments herein is to provide a beamer board without attached hooks, rings, hangers/handle, thereby enabling easy stowing on boats.

Yet another object of the embodiments herein is to provide beamer board capable of eliminating a need of carrying a plurality of devices for measuring length and weight of multiple catches.

These and other objects and advantages of the embodiments herein will become readily apparent from the following detailed description taken in conjunction with the accompanying drawings.

SUMMARY

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The various embodiments of the present invention provide a beamer board capable of culling fishes. The beamer board enables a user to quickly measure the length and compare the weight of fishes caught. Therefore, the beamer board eliminates the need for carrying multiple devices for measuring a length and comparing the weight of the fishes. Further, the beamer board enables the user to identify the fishes that needs to be retained and the fishes that need to be culled back quickly and conveniently.

According to an embodiment herein, a beamer board for measuring length and comparing weight of two identical objects is provided. The beamer board comprises an elongated beam, a first attachment, a slot and a pair of notches. The elongated beam is configured to enable an individual to measure a length of an object. The elongated beam comprises a plurality of measurement marks provided along the length of the elongated beam for enabling a length measurement. The first attachment extending from a first end of the elongated beam acts as a starting point for measuring length. The first attachment is provided at 90 degrees from longitudinal axis of the elongated beam. The slot is provided at a center of the beam along the length direction of a first long side of the elongated beam for hanging the elongated beam on a holder. The slot act as a fulcrum balance point. The pair of notches is configured for hanging the objects for comparing the weight of two identical objects. The pair of notches is milled at two sides of the slot along the length direction of the first long side of the elongated beam.

According to an embodiment herein, the plurality of measurement marks is provided along the length direction of the elongated beam in inches.

According to an embodiment herein, the plurality of measurement marks comprises a first measurement mark marked/provided at 12 inches from the first attachment.

According to an embodiment herein, the plurality of measurement marks is marked/provided at an interval of one inch from the first measurement mark.

According to an embodiment herein, the first attachment is configured to enable an individual to keep one end of the object at the first attachment and measure the length using the plurality of measurement marks.

According to an embodiment herein, the elongated beam with the slot and the pair of notches is configured to act as a balance beam and is configured to comparing the weight of the identical objects.

According to an embodiment herein, the elongated beam is hanged on the holder using a detachable handle.

According to an embodiment herein, the beamer board is used for culling fishes in competitive fishing.

According to an embodiment herein, the beamer board enables an individual to retain heavier fishes while releasing the light weight fishes.

According to an embodiment herein, the pair of notches enables a user to compare the weight of fishes during culling.

According to an embodiment herein, each notch among the pair of notches is used for hanging a cull marker comprising a fish for comparing the weight of the fishes.

According to an embodiment herein, the elongated beam is made of metal and wherein the metal is aluminium.

According to an embodiment herein, the elongated beam is 18 inches long, ⅛ inches thick and 2 inches wide.

According to an embodiment herein, the pair of notches is milled at 6 and ½ inches on two sides along the length of the first long side of the elongated beam from the slot.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

BRIEF DESCRIPTION OF THE DRAWINGS

The other objects, features and advantages will occur to those skilled in the art from the following description of the preferred embodiment and the accompanying drawings in which.

Figure 1A:
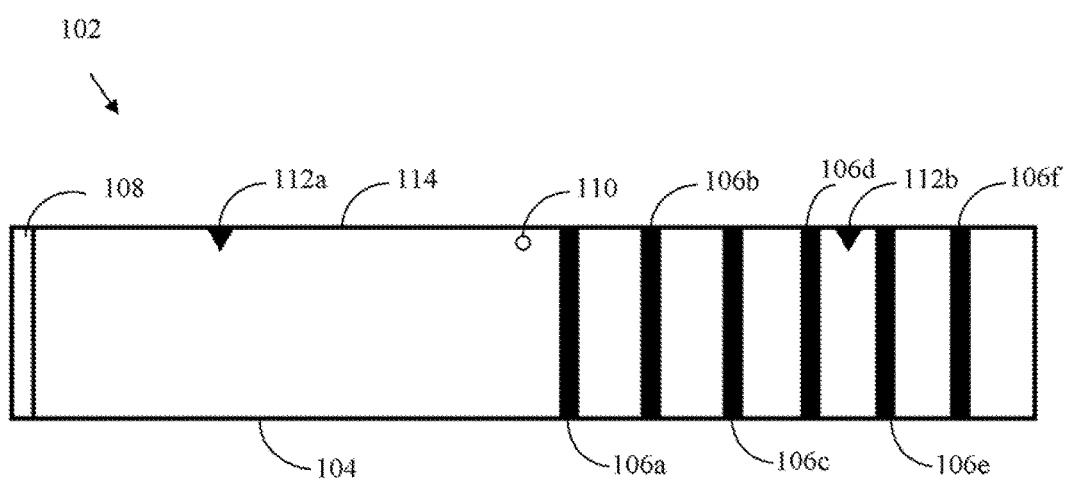
FIG. 1A illustrates a top view of a beamer board, according to one embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments of the present invention provide a beamer board capable of culling fishes. The beamer board enables a user to quickly measure the length and compare the weight of fishes caught. Therefore, the beamer board eliminates the need for carrying multiple devices for measuring a length and comparing the weight of the fishes. Further, the beamer board enables the user to identify the fishes that needs to be retained and the fishes that need to be culled back quickly and conveniently.

According to an embodiment herein, a beamer board for measuring length and comparing weight of two identical objects is provided. The beamer board comprises an elongated beam, a first attachment, a slot and a pair of notches. The elongated beam is configured to enable an individual to measure a length of an object. The elongated beam comprises a plurality of measurement marks provided along the length of the elongated beam for enabling a length measurement. The first attachment extending from a first end of the elongated beam acts as a starting point for measuring length. The first attachment is provided at 90 degrees from longitudinal axis of the elongated beam. The slot is provided at a center of the beam along the length direction of a first long side of the elongated beam for hanging the elongated beam on a holder. The slot act as a fulcrum balance point. The pair of notches is configured for hanging the objects for comparing the weight of two identical objects. The pair of notches is milled at two sides of the slot along the length direction of the first long side of the elongated beam.

According to an embodiment herein, the plurality of measurement marks is provided along the length direction of the elongated beam in inches.

According to an embodiment herein, the plurality of measurement marks comprises a first measurement mark marked/provided at 12 inches from the first attachment.

According to an embodiment herein, the plurality of measurement marks is marked/provided at an interval of one inch from the first measurement mark.

According to an embodiment herein, the first attachment is configured to enable an individual to keep one end of the object at the first attachment and measure the length using the plurality of measurement marks.

According to an embodiment herein, the elongated beam with the slot and the pair of notches is configured to act as a balance beam and is configured to comparing the weight of the identical objects.

According to an embodiment herein, the elongated beam is hanged on the holder using a detachable handle.

According to an embodiment herein, the beamer board is used for culling fishes in competitive fishing.

According to an embodiment herein, the beamer board enables an individual to retain heavier fishes while releasing the light weight fishes.

According to an embodiment herein, the pair of notches enables a user to compare the weight of fishes during culling.

According to an embodiment herein, each notch among the pair of notches is used for hanging a cull marker comprising a fish for comparing the weight of the fishes.

According to an embodiment herein, the elongated beam is made of metal and wherein the metal is aluminium.

According to an embodiment herein, the elongated beam is 18 inches long, ⅛ inches thick and 2 inches wide.

According to an embodiment herein, the pair of notches is milled at 6 and ½ inches on two sides along the length of the first long side of the elongated beam from the slot.

Figure 1B:
FIG. 1B illustrates a side view of a beamer board, according to one embodiment herein.
Figure 1C:
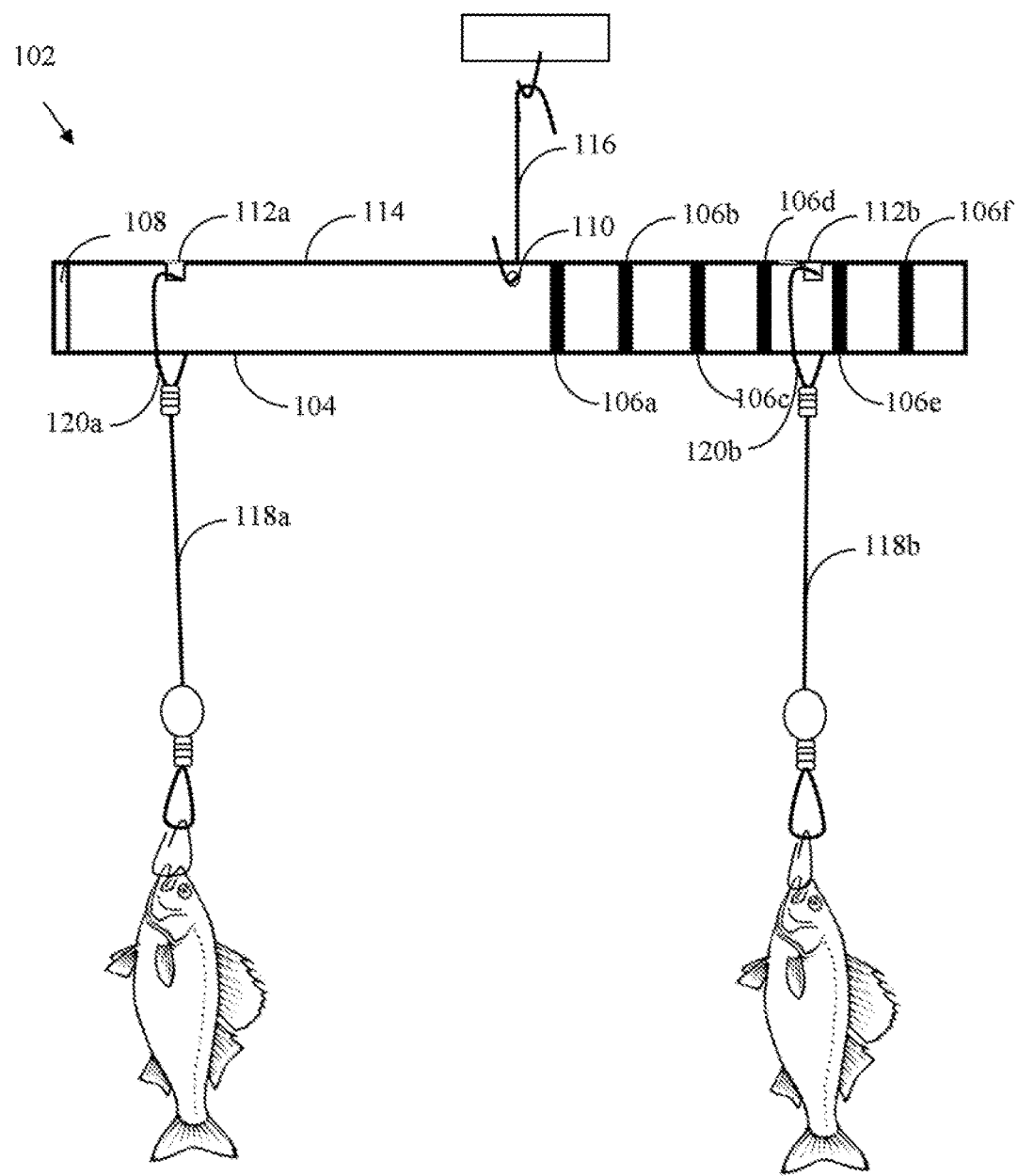
FIG. 1C illustrates a side view of a beamer board provided with cull markers used for culling fishes, according to one embodiment herein.

FIG. 1A illustrates a top view of a beamer board, according to one embodiment herein. FIG. 1B illustrates a side view of a beamer board, according to one embodiment herein. FIG. 1C illustrates a beamer board with cull markers used for culling fishes, according to one embodiment herein. With respect to FIG. 1A-FIG. 1C, the beamer board 102 is a multi-functional apparatus capable of measuring the length and comparing the weight of two identical objects. The beamer board 102 is used for culling fishes in competitive fishing. The beamer board 102 enables the fisherman to quickly measure the length and compare the weight of the fishes caught. Therefore the beamer board 102 is capable of identifying the fishes that needs to be retained and the fishes that needs to be culled. The beamer board 102 enables a user to perform both functions without the need for carrying multiple devices.

The beamer board 102 comprises an elongated beam 104, a plurality of measurement marks 106a, 106b . . . 106f, a first attachment 108, a slot 110 and a pair of notches 112a and 112b. The elongated beam 104 is configured to act as a measurement scale for measuring length of the fishes. The elongated beam 104 is made of aluminum metal. The elongated beam 104 is 18 inches long, ⅛ inches thick and 2 inches wide in dimension. The elongated beam 104 comprises the plurality of measurement marks 106a, 106b . . . 106f inscribed on the elongated beam 104. The plurality of measurement marks 106a, 106b . . . 106f include a first measurement mark 106a provided at a distance of 12 inches from a first end of the elongated beam 104. The remaining measurement marks 106b . . . 106f among the plurality of measurement marks 106a, 106b . . . 106f are marked/provided at a gap of one inch to a second end of the elongated beam 104. Therefore, the plurality of measurement marks 106a, 106b . . . 106f is marked from 12 inches to 18 inches with one inch increment.

The elongated beam 104 comprises the first attachment 108 extending from the first end of the elongated beam 104. The first attachment 108 protrudes at 90 angular degrees from longitudinal axis of the elongated beam 104. The first attachment 108 is of two inches long. The first attachment 108 act as a starting point for measuring the length of the fishes. The elongated beam 104 enables the user to keep one end of the object at the first attachment 108 and other end along the length of the elongated beam 104. Therefore, the head of the fish is kept close to the first attachment 108 and the length is measured up to the tail of the fishes. The individual is enabled to take measurement using the reading provided by the plurality of measurement marks 106a, 106b . . . 106f. Thus, the elongated beam enables the individual to quickly measure the fishes.

Further, the elongated beam 104 acts as a balance beam for comparing the weight of multiple catches. The elongated beam 104 comprising the slot 110 and the pair of notches 112a and 112b acts as the balance beam. The slot 110 is provided at centre along length of a first long side 114 of the elongated beam 104. The slot 110 is configured for hanging the elongated beam 104 on a holder. The holder is custom made holder. The slot 110 act as a fulcrum balance point of the balance beam. The slot 110 is circular in shape with a diameter of 4/16 inches. The elongated beam 104 is hanged on the holder using a detachable handle 116 passing through the slot 110. The detachable handle 116 is removed and kept separately when not in use. The beamer board 102 does not contain attached hooks, rings, hangers/handle, thereby enabling easy towing on boats.

Further, the pair of notches 112a and 112b is cut at two sides of the slot 110 along the length of the first long side of the elongated beam 104. Each notch among the pair of notches 112a and 112b is cut at a distance of 6 and ½ inches from the slot 110. The pair of notches enables the individual to hang each fish on each notch to compare the weight of the two fishes. A plurality of cull markers 118a, 118b . . . 118n is provided for hanging the fishes on the pair of notches. The user carries 5-10 cull markers with the beamer board, based on the number of fishes that needs to be caught in the competition. The beamer board with cull markers is depicted in FIG. 1C. Each cull marker among the plurality of cull markers 118a, 118b . . . 118n comprises a looped cable, and culling tag/float marker. The culling tag/float marker in each cull marker is of different colors for easy identification of the fishes.

Further, the elongated beam 104 is hanged on the holder using the detachable handle 116 for comparing the weight of the fishes. Each fish caught is held using a cull marker. A first cull marker 118a is hanged on a first notch 112a using a first looped cable 120a. Further, a second cull marker 118b is hanged on a second notch 112b using a second looped cable 120b. The heavier fish pulls down the elongated beam 104 thereby pulling up the lightweight fish. Therefore, the elongated beam 104 enables the individual to identify the heavier and lightweight fishes. Thus the user is enabled to retain heavier fishes and cull away the lightweight fishes back into the live well.

Figure 2:
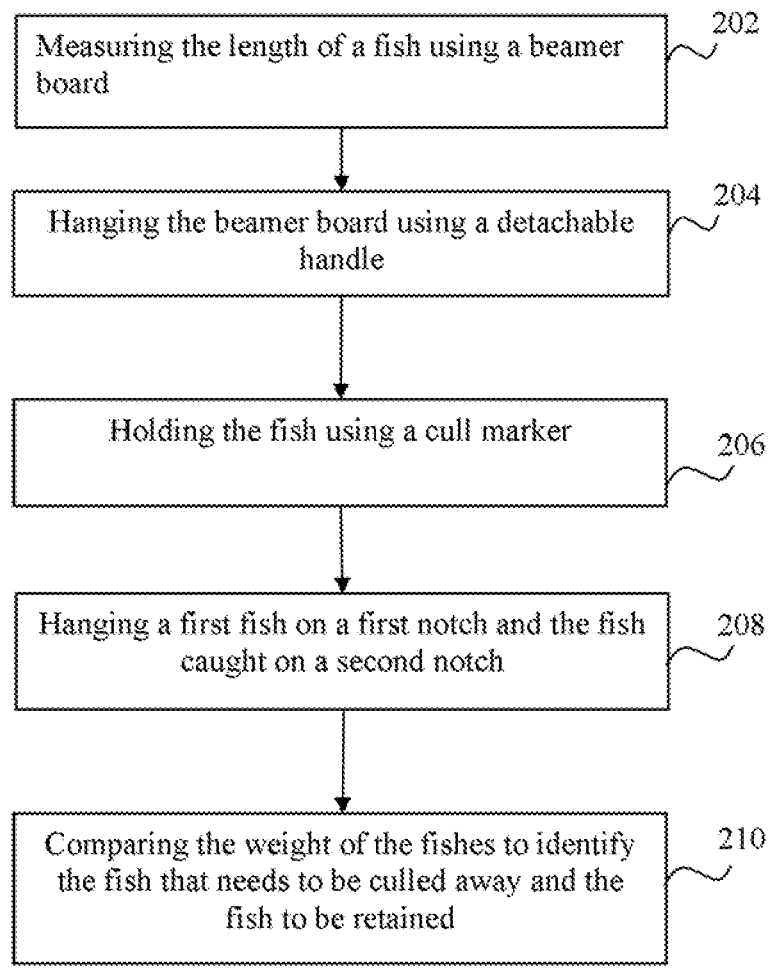
FIG. 2 illustrates a flow chart explaining a method of culling fishes using a beamer board, according to one embodiment herein.

FIG. 2 illustrates a flow chart explaining a method of culling fishes using a beamer board. The beamer board is a multifunctional apparatus capable of measuring length and comparing weights of the fishes during a fishing tournament. The user is initially enabled to measure the length of a fish caught using a beamer board (202). In order to measure the length, head of the fish is placed at a first attachment of the beamer board and body of the fish along length of an elongated beam of the beamer board. Further, the length is measured using a plurality of measurement marking provided along the length of the elongated beam. The plurality of measurement marks is provided in inches. Therefore, the length of the fish is measured in inches. The length is measured to identify if the length of the fish satisfies the criteria set by the tournament.

Further, the weight of the fishes needs to be compared using the beamer board. For weighing the fishes, the beamer board is hanged on a holder using a detachable handle (204). The detachable handle is attached to the beamer board through a slot at the center along length of a first long side of the elongated beam. The slot act as a fulcrum balance point for balancing the beamer board. Further, the fish is held using a cull marker (206). The cull marker comprises looped cable for hanging the fish on to the beamer board and a cull tag/float marker for easy identification of fishes. The cull tags are of different colors for easy identification.

Further, the method includes hanging a first fish on a first notch and the fish caught on a second notch (208). The first fish is a fish caught previously by the user. The fishes are hanged on the beamer board using the cull markers. Each cull marker comprises a looped cable for enabling a user to hang the fishes on the beamer board. The looped cable is passed through the notch for hanging the fishes on the beamer board. Further, the weights of the fishes are compared to identify the fish that needs to be culled away and the fish to be retained (210). The heavier fish pulls down the beamer board to one side thereby lifting the light fish up. Thus the user is able to identify the heavier fish and the lightweight fish. The heavier fish is retained and the lightweight fish is culled away back into the live well. The method enables the user to identify if the fishes in the live well are heavier than the fishes caught.

Therefore, the beamer board is a multifunctional apparatus enabling a user to measure length and compare weight of any two identical objects. The beamer board is used for different purpose including culling fishes. The beamer board eliminates the need for carrying multiple devices for measuring length and weight of fishes. The beamer board performs the function of a measuring board as well as a balance beam. Therefore, the beamer board enables the user to easily measure the length and identify the heavier fish. Thus the user is enabled to quickly cull back the lightweight fish and retain the heavier fishes.

Further, the beamer board does not contain attached hooks, rings, hangers/handle that gets tangled easily and become problematic for stowing boat. Instead the beamer board is hanged on any holder using a detachable handle. This makes the transportation and use of the beamer board convenient. Further, the beamer board is capable of being used with different types of cull markers available in the market.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A culling system with an integrated balance beam cum measuring board for measuring length and comparing weight of two identical objects, the system comprising:
   an elongated beam configured to enable an individual to measure the length of an object, wherein the elongated beam comprises a plurality of measurement marks provided along a length direction of the elongated beam for enabling a length measurement, wherein the elongated beam is hanged on a holder using a detachable handle;
   a first attachment extended from a first end of the elongated beam and configured to act as a starting point for measuring a length of a fish, wherein the first attachment is provided at 90 degrees from a longitudinal axis of the elongated beam;
   a slot arranged at a centre of the elongated beam along a length direction at a first long side of the elongated beam for hanging the elongated beam on a holder, wherein the slot is configured to act as a fulcrum balance point; and
   a pair of notches arranged along the length direction of the elongated beam and configured for hanging the objects for comparing a weight of two identical objects, and wherein the pair of notches is milled at two sides of the slot along the length direction at the first long side of the elongated beam, and wherein the pair of notches are cut on two sides along the length of the first long side of the elongated beam from the slot, and wherein each notch among the pair of notches is configured for hanging a cull marker comprising a fish for comparing the weight of the fish, and wherein a plurality of cull markers is provided for hanging the fishes on the pair of notches, and wherein each cull marker among the plurality of cull markers comprises a looped cable and a culling tag/float marker, and wherein the culling tag/float marker in each cull marker is of different colors for easy identification of a plurality of fishes.

2. The system according to claim 1, wherein the plurality of measurement marks are provided along the length direction of the elongated beam in inches.

3. The system according to claim 1, wherein the plurality of measurement marks comprises a first measurement mark arranged at 12 inches from the first attachment.

4. The system according to claim 1, wherein the plurality of measurement marks is provided at an interval of one inch from the first measurement mark.

5. The system according to claim 1, wherein the first attachment is configured to enable an individual to keep one end of the object at the first attachment and measure the length using the plurality of measurement marks.

6. The system according to claim 1, wherein the elongated beam along with the slot and the pair of notches is configured to act as a balance beam for comparing the weight of the objects.

7. The system according to claim 1, wherein the board is configured for measuring the length of the plurality of fishes and comparing the weight of the plurality of fishes in culling.

8. The system according to claim 1, wherein the board is configured to retain the heaviest fishes and release the light weight fishes based on a weight comparison.

9. The system according to claim 1, wherein the pair of notches is are configured to enable a user to compare the weight of the plurality of fishes during culling.

10. The system according to claim 1, wherein the elongated beam is made of aluminium metal.

11. The system according to claim 1, wherein the elongated beam is 18 inches long, ⅛ inches thick and 2 inches wide.

12. The system according to claim 1, wherein the pair of notches is are milled at 6 and ½ inches on two sides along the length of the first long side of the elongated beam from the slot.

* * * * *